May 14, 1968 C. W. DIGGS 3,383,094
ROTOR BLADE LOCKING MEANS
Filed Jan. 19, 1967 2 Sheets-Sheet 1
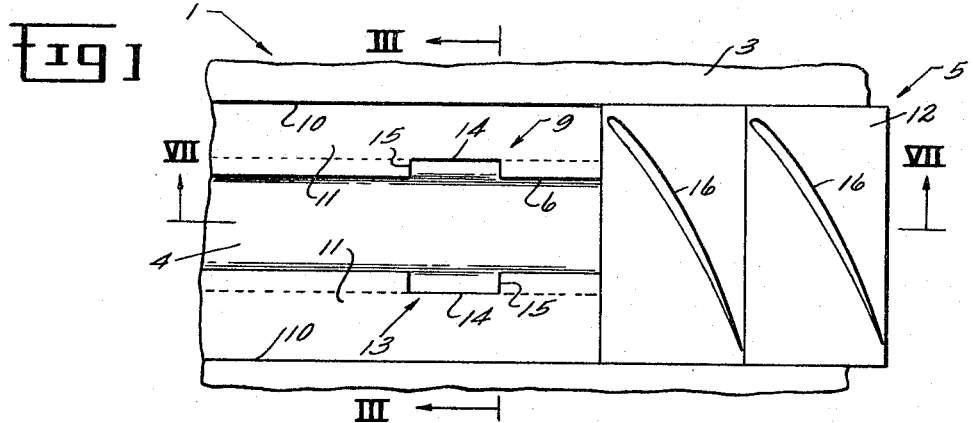
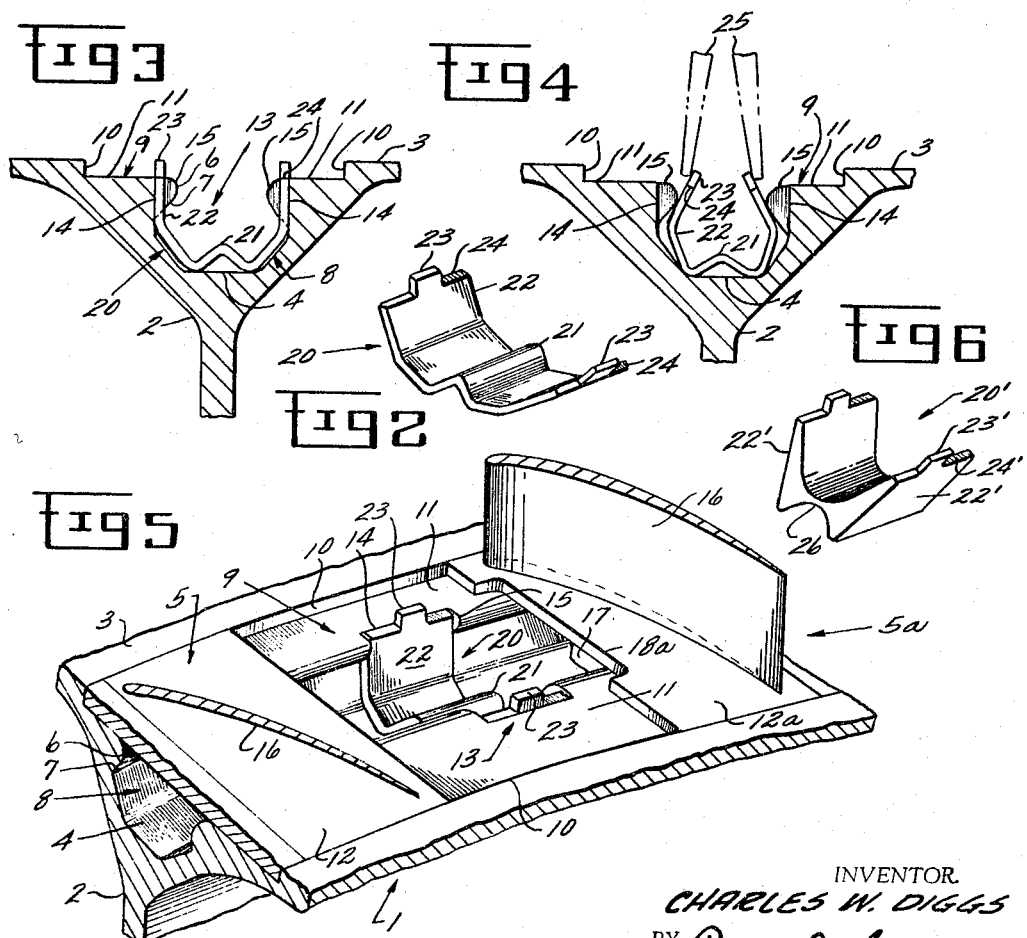
INVENTOR.
CHARLES W. DIGGS
BY
ATTORNEY

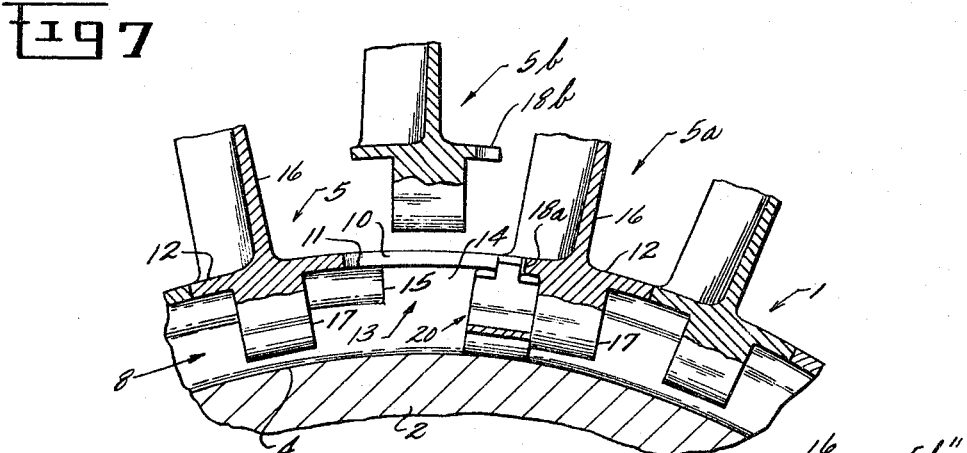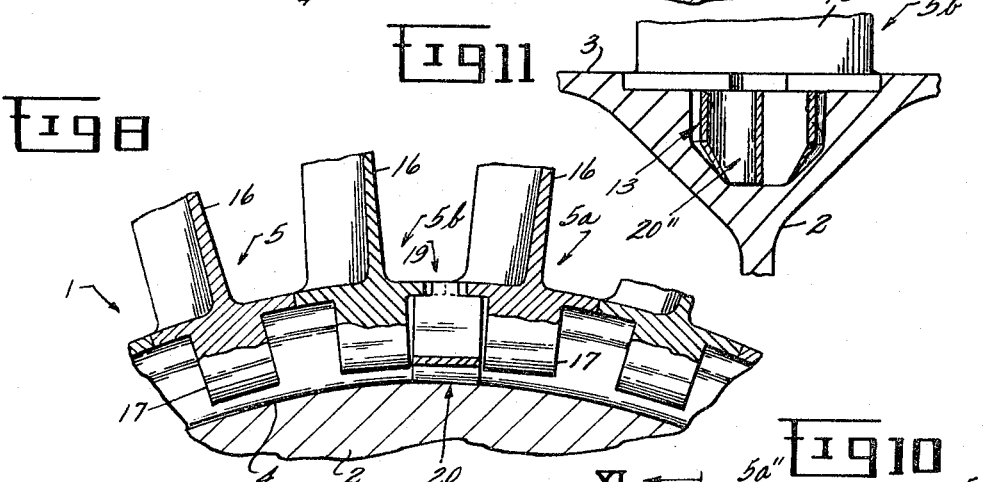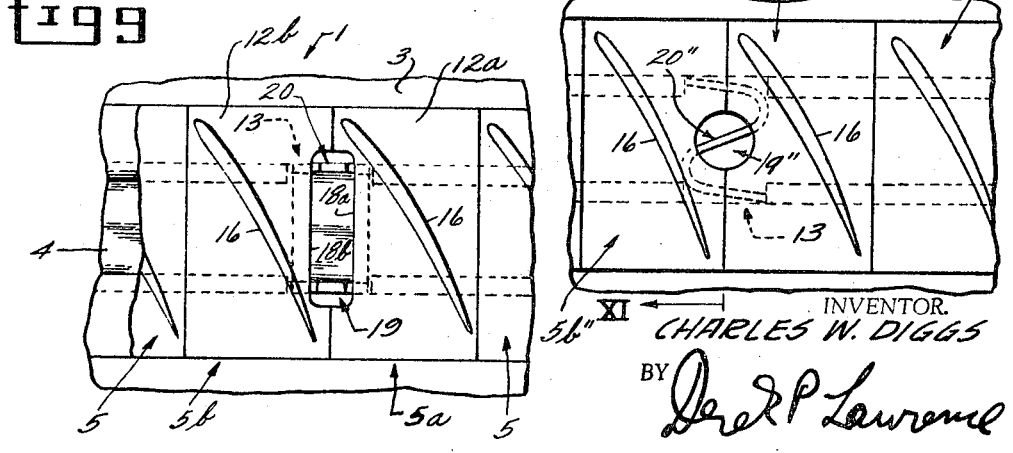

3,383,094
ROTOR BLADE LOCKING MEANS
Charles W. Diggs, Dorchester, Mass., assignor to General
Electric Company, a corporation of New York
Filed Jan. 19, 1967, Ser. No. 610,270
7 Claims. (Cl. 253—77)

ABSTRACT OF THE DISCLOSURE

This disclosure sets forth a relatively simple but highly effective means for locking a series or row of bladed members in position within a retaining groove of a drum type rotor assembly for a gas turbine engine. A one-piece springlike, resilient locking device is described, herein, for effecting this purpose. The disclosure discusses three alternative embodiments of the locking device including a preferred U-shaped form. The various embodiments are described in detail with reference to and the aid of the drawing here attached, particularly FIGS. 2–6, and 10–11. In addition, a detailed description of the procedure followed in assembling the bladed members and locking device to the rotor, as well as the parts arrangement within the assembly is given by the disclosure with reference in particular to FIGS. 1, 3, 5 and 7–9 of the drawing.

---

The present invention relates to bladed rotors for axial flow turbomachinery and the like and, more specifically to such an assembly having a relatively simple blade locking means. The blade locking means of the invention is particularly suited for use in relatively small lightweight rotor assemblies utilizing thin-walled relatively high-stressed rotor body or drum structures supporting airfoil members. Such airfoil members are arranged in rows of individual compressor or turbine blades disposed in circumferentially extending slots or grooves in a rotor drum wherein particular attention must be paid to the reduction or elimination of areas of stress concentration.

With increased usage of improved, lightweight, high strength construction materials, such as titanium and other alloys having similar properties, in the construction of turbomachinery, e.g., aircraft gas turbine engine components, some design problems have arisen. For example, while it is advantageous to use lightweight, thin-walled relatively small diameter drum-type rotor body structures having individual removable airfoil members in axial flow compressors, the use of such makes avoidance of stress concentration points very important. Heretofore, it has been possible to lock the bladed members in position by use of staking or screw means threadably engaged with the rotor drum and located in or adjacent to the circumferential slot or groove in which the blades are retained against the action of centrifugal force during rotor operation. The staking acts to prevent relative circumferential movement of the blades in the groove. However, this solution gives rise to an associated stress concentration at the area of the hole in the lightweight, highly-stressed rim or outer diameter of the main rotor body or drum. In addition, with this arrangement the locking means or set screw engaged in the drum is itself, subjected to damaging shear stresses. Frequently, with modern high speed turbomachinery the shear stresses become too great for the screw or stake and the reliability of the blade locking system is substantially reduced.

Other solutions to the problem have involved the use of a blade locking device wherein the means actuated to achieve locking, while not threadably engaged with the rotor drum, nevertheless imposes undesirable loads on the portions of the individual blade members. Specifically, one known means for locking compressor blades, utilizes a locking block having an actuating member threadably engaged therewith for moving the block from an initial unlocked position outwardly to a final locked position in the groove wherein the locking block loads the underside of the platform section of the blade causing thereby a highly stressed local area. The platforms typically comprise, in cooperation with the outer surface of the drum, the inner part of the aerodynamic flow path in the turbomachine. By the increased use of modern lightweight, highly-stressed materials, such as the aforementioned titanium and similar alloys, particularly in the relatively small turbomachines, the imposition of such stresses on the blade platforms by locking arrangement similar to the one just described are highly undesirable.

Furthermore, in relatively small turbomachines operated at extremely high rotational speeds, it oftentimes happens that the outer diameter or rim area of the main rotor drum deforms slightly, however, this deformation is enough to allow partial movement of the blades in the circumferential retaining groove. It is important, therefore, to provide positive locking means which will remain effective even when such deformation and blade movement occurs. Moreover, in such rotor configurations the blade members are usually inserted through a so-called loading slot cut transversely of the groove, the complete blade row being rotated slightly before locking so that no one blade remains removable from the loading slot. In such an arrangement it becomes important that the blades be restrained from moving into the loading slot during rotor operation. Since it is also undesirable to rely solely on friction to lock these blades a new solution other than that disclosed in prior known devices must be provided.

In summary, therefore, in the case of lightweight, highly stressed, thin-walled rotor structures, it is particularly important to avoid undue stress concentrations and, particularly in small diameter rotors having blades with small blade root means or dovetails retained in similarly shaped grooves, the blades must be blocked from the loading slot with a positive locking action without unduly loading portions, e.g., platform sections, of the blades. Furthermore, it is desirable not to rely on friction to lock the blades and to avoid the increased stress concentration in the rotor drum associated with "staking" or threadably-engaged screw type locking actuation means.

It is, therefore, a general object of the present invention to devise a new and improved rotor blade locking means for a lightweight, highly-stressed, rotor assembly utilizing thin-walled elements.

A more specific object of the present invention is a new and improved rotor blade locking means for use in a drum-type roto having a circumferential groove into which blade members may be individually inserted and removed, wherein the blade locking member does not impose any undue additional loads on the blade members.

A further object of the present invention is to provide a relatively simple improved rotor blade locking means whereby undue stress concentrations are avoided in the main rotor supporting structure comprised of a lightweight, initially highly-stressed alloy material.

A further more specific object of the present invention is to provide for use in a drum type rotor assembly having circumferentially extending slots for retaining individual bladed members, a relatively simple, one-piece locking device which will minimize stress concentrations both in the main rotor structure and the individual blade members, and, particularly in the case of relatively small diameter rotor assemblies which will maintain a positively locked condition although rotor rim deformation occurs.

Briefly, the invention relates to a relatively simple one-piece locking device which is employed in an arrangement of rotor parts for counteracting the detrimental effects of centrifugal force. The inventive arrangement of parts includes a retaining groove having a widened portion or loading slot, a plurality of bladed members arranged in a circumferentially extending row of which the last pair of bladed members to be assembled in the row serve as locking blades, and a one-piece resilient spring-like locking device which is different from any other known similar device, that is positioned in the loading slot in locking engagement with the walls thereof, so as to lock the bladed members of the circumferentially extending row in position.

While the basic arrangement of parts is not changed, various embodiments of the one-piece resilient spring-like locking device which is used in the rotor assembly are contemplated and will occur to those skilled in the art. These various embodiments relate to differences in form rather than in principle. For example, the one-piece locking device may be U-shaped or it may be S-shaped depending on the particular application to which it is put or simply the choice of one of skill in the art.

The subject matter which is regarded as the invention, as well as various embodiments thereof, is particularly pointed out and distinctly claimed in the concluding portion of this specification. The invention, however, both as to organization and method of operation; together with further objects and advantages thereof, are discussed in detail and may best be understood by reference to the following description taken in conjunction with the accompanying drawings in which:

FIG. 1 is a plan view of a portion of a partially completed rotor assembly.

FIG. 2 illustrates the locking device of the invention in perspective.

FIG. 3 is the view taken along III—III of FIG. 1 with the locking device of the invention in the loading slot.

FIG. 4 is the same view as FIG. 3 illustrating how the locking device is unlocked.

FIG. 5 is a pictorial illustration of a portion of a partially assembled drum-type rotor body having a circumferentially extending retaining groove, bladed members and locking device according to the invention.

FIG. 6 illustrates another embodiment of the locking device of the invention in perspective.

FIG. 7 is the view along VII—VII of FIG. 1 and illustrates how the bladed members of the rotor are assembled.

FIG. 8 is the same view as FIG. 7 illustrating bladed members and locking device of the invention finally assembled and in locked position.

FIG. 9 is a plan view of a portion of the assembled rotor with the locking device of the invention in locked position.

FIG. 10 is the same view as FIG. 9 illustrating yet another form of the locking device according to the invention.

FIG. 11 is the view taken along XI—XI of FIG. 10.

Referring now to the drawings and specifically to FIGS. 1 and 5, a portion of a rotor assembly configuration is shown therein which is useful in both steam and gas turbine machinery, although the illustration is more typical of a lightweight aircraft gas turbine engine. Indicated generally by the numeral 1 is a segment of a main rotor of the drum type. The rotor body, which is basically a support structure, includes a number of enlarged rim areas or disc members 2. The disc members 2 are spaced axially from each other and are joined by a relatively thin-walled shell structure 3. Each disc member 2 of the rotor body includes a groove 4 for retaining bladed members, generally indicated as 5, which extends the full circumferential distance around the disc 2 in a plane perpendicular to the axis, thereof.

The transverse sections as depicted in FIGS. 3–5, disclose a groove shape which conforms to the dove-tail arrangement widely used for retaining complementary-shaped bladed members in rotors. That is to say, the groove shape illustrated in FIGS. 3, 4 and 5 is defined by a necked portion 6 which opens by way of a pair of divergent walls 7—7, which act as load surfaces, into a wider base portion, generally indicated as 8. It will be understood, that while a dovetail shaped groove is here shown, other suitable shapes are possible and will occur to those of skill in the art.

Referring once more to FIGS. 1 and 5 and also to FIGS. 3 and 4, a channel generally indicated, as 9, is shown, therein. As disclosed in the figures, portions of channel 9 are provided on either side of and contiguous with the necked portion 7—7 of retaining groove 4 and is defined by sidewalls 10—10 and bottom surfaces 11—11. The portions of channel 9 located on either side of retaining groove 4 taken together serve as a platform seat for the platform sections 12 of the bladed members 5 inserted into and retained by groove 4. By this arrangement, the outer surfaces of the platforms 12 cooperate with the outer surface of the rotor drum to form a continuous aerodynamic flowpath through the turbomachine when the bladed members 5 are inserted into retaining groove 4.

As best depicted in FIGS. 1 and 5 and also shown in FIGS. 3 and 4, the retaining groove 4 is further characterized by a widened portion, 13. The loading slot 13 is defined by cut-away portions on both sides of retaining groove 4 having side-walls 14 and shoulders 15.

In the case of either gas or steam turbines, airfoil or bladed members must be provided to utilize the force created by the motive fluid moving through the turbomachine to produce power. As shown in FIGS. 1 and 5–11, and particularly FIGS. 7 and 8 the bladed members 5 typically include blade portion 16, the aforementioned platform section 12, for providing a continuous aerodynamic flow-path with the rotor drum, and a blade base or root portion 17 which is a dovetail-shaped member adapted to be received in the groove 4 by insertion through loading slot 13. The shape and size of the root portion 17 of the bladed member 5 is, of course, a matter of choice for those of skill in the art and size and shape of the retaining groove 4 is determined accordingly. It is desirable to provide a close fit between the root portions 17 and the similarly shaped groove 4, that will at the same time allow circumferential sliding of bladed members 5. Thus, as shown in FIGS. 1 and 5–11, bladed members 5, having been loaded into retaining groove 4 through slot 13, have been moved therefrom, to a position circumferentially beyond.

Turning to FIGS. 5, 7, 8 and 9 among the bladed members, there depicted, are some having a cutaway portion in the edge of the platform section. In particular, as illustrated in FIG. 9, a pair of bladed members 5a and 5b serve as locking blades. The locking blades 5a and 5b include platform sections 12a and 12b, respectively. Furthermore, each platform section, 12a and 12b includes an edge having a cutaway portion designated 18a and 18b, respectively. The cutaway portions are so positioned, that when the edges of platform sections 12a and 12b in which they are provided are brought together in abutting relationship, they form an excess slot 19. The locking blades will be discussed in greater detail in connection with the procedure of assembly in the description which follows. Suffice it to state for now, that the locking blades 5a and 5b are the last pair of bladed members to be assembled in the rotor.

As best depicted in FIG. 2 an improved, relatively simple, one-piece locking device, 20, is shown. According to the invention, the locking device 20 is formed from a flexible material in order that the device, 20, will characteristically be springlike and resilient. The FIG. 2 embodiment, which is a preferred form, discloses a generally U-shaped element provided with a crimped section 21 at the bottom of the U which aids in imparting the characteristic of resilience to the legs 22 which extend divergently from the bottom portion of the U. The locking device 20, thus formed, is capable of urging the legs 22, resiliently back to an unstressed condition after they have been distorted. Each leg 22 includes a tab 23 on its end to facilitate handling of the locking device 20 with a tool 25, as shown in shadow in FIG. 4. The tool 25 applies pressure to tabs 23 to squeeze legs 22 towards each other. On either side of tabs 23, lands 24 are provided. When all the parts of the rotor are finally assembled, the lands 24 will rest beneath the undersurface of platforms 12a and 12b of locking blades 5a and 5b respectively, and the locking device 20 thereby trapping locking device 20 and preventing its radial movement.

Turning now to FIGS. 3 and 4, locking device 20 is illustrated in FIG. 3 after having been inserted into slot 13. The legs 22, in this position are sufficiently stressed to load them against sidewalls 14. In this position locking device 20 is prevented from circumferential movement. It is in the position depicted in FIG. 3 that the locking device 20, locks the bladed members after all are assembled, in position and holds them from further circumferential movement in groove 4. In this position, radial movement by the bladed members is also precluded, since the locking device 20 blocks slot 13 from their entry.

As FIG. 3 shows, locking device 20 is configured to conform to the shape of base portion 8 of groove 4 when positioned in slot 13. Locking element 20 is thus fitted snugly into loading slot 13, legs primarily loaded against sidewalls 14, and, contrary to other known locking arrangements, no outward loading against the platforms of locking blades 5a and 5b is required. Stress concentrations normally experienced by thin-walled platform members, where known locking devices are used, are thus avoided.

FIG. 4 discloses locking device 20 just prior to insertion of the last locking blade of the assembly. In this position, locking device 20 has been moved circumferentially from loading slot 13 through groove 4. To enable this movement beyond shoulders 15, the legs 22 have been distorted, squeezed towards each other, to a stressed position with aid of tool 25, which is used to apply pressure to tabs 23. The locking device 20, is illustrated in a position just prior to initiation of its locking action. When the locking device 20 is repositioned in loading slot 13 and legs 22 are released, they will spring outwardly and lockingly engage the sidewalls 14 as shown in FIG. 3 and again in FIG. 5.

For a more complete understanding of the invention the steps required in assembling and locking the bladed members 5 in the disc member 2 will now be described. It must be understood that initially all the bladed members except the last two are inserted through loading slot 13 into retaining groove 4. The last two bladed members to be so introduced into the retaining groove 4 are the locking blades 5a and 5b. These last bladed members and with them the locking device are introduced into the rotor assembly as follows.

Referring in particular to FIGS. 5, 7 and 9 the first locking blade 5a is inserted through loading slot 13 and mounted in groove 4, the locking blade 5a is so assembled that the edge of platform section 12, which includes cutaway portion 18a is closest to and faces loading slot 13 after the blade 5a has been moved circumferentially beyond loading slot 13.

The locking device 20 is next inserted into loading slot 13 as shown in FIG. 3. The locking device 20 is introduced radially with the tab end of its legs 22 radially extended outward, that is, with the bottom of the U-shaped element positioned in the base portion 8 of groove 4. It will be noted in FIG. 3 and more clearly in FIG. 5 that tabs 23 of locking device 20 protrude above the level of surface 11 of channel 9 while lands 24 are flush therewith.

Referring to FIG. 2, the legs of locking device 20, as mentioned above, are fit snugly into loading slot 13 with legs 22 loaded against sidewalls 14. Turning now to FIG. 3, the next step in the assembling operation is to engage the tabs 23 of locking device 20 with aid of tool 25. The legs 22 are squeezed towards each other, thereby distorting the device 20 sufficiently to free it from loading slot 13 for movement circumferentially through retaining groove 4 to a point beyond the slot 13 in the direction of locking blade 5a. The locking device 20, thus moved, is positioned so that lands 24 on the same side of locking device 20, as first locking blade 5a, fit beneath the platform section 12a of that blade. This is best illustrated in FIG. 7.

Subsequent to moving the locking device 20 out of the loading slot 13, in the manner just described, the second locking blade 5b shown just prior to assembly in FIG. 7, is inserted into loading slot 13, its cutaway portion 18b facing cutaway portion 18a of the first locking blade. Thus positioned, the legs 22 of the locking device 20 are once again distorted, as described above the second blade 5b along with the entire series of bladed members and locking device is shifted circumferentially through groove 4, once more, until the locking device 20 is positioned in the loading slot 13 where legs 22 are released. The legs thus released spring against and lockingly engage sidewalls 14. The series of bladed members 5 is thus locked in position and prevented from circumferential movement as shown in FIGS. 8 and 9. By this arrangement the bladed members are able to maintain their respective positions regardless of the centrifugal forces generated during rotor operation. The locking device 20, itself, is restrained from circumferential as well as tangential movement, by shoulders 15 of the loading slot 13. Furthermore, the device 20 is prevented from movement radially by lands 24 which lie flush with level surface 11 of channel 9 and beneath portions of the platform sections 12a and 12b of bladed members 5a and 5b, respectively. The sections 12a and 12b are thus in position to block any radial movement by device 20 which may occur. In this position, the tabs 23 protrude through the access slot 19 as shown in FIGS. 8 and 9. The tabs 23 are thus formed by cutaway portions 18a and 18b of the locking blades which abut each other within easy access of a tool, thereby permitting the row of bladed members to be readily disassembled when desired.

The completed rotor assembly is disassembled as easily as it is assembled. The procedure described in the foregoing is simply reversed. Briefly, the legs 22 of locking device 20 are squeezed towards each other thereby freeing it from the shoulders 15 of the loading slot 13. Then the locking device 20, as well as all bladed members 5, are shifted circumferentially in the groove 4 until the locking device 20 no longer blocks the loading slot 13 and the locking blade 5b is moved into slot 13 and freed for removal therefrom. After the locking blade 5b is removed, the legs 22 are once more distorted and the locking device 20 and the remaining bladed members are again shifted circumferentially through groove 4 until the locking device is once more seated in the loading slot 13 from whence it is removed. This done, the remaining bladed members may be removed in like manner from the retaining groove 4 by way of the loading slot 13.

Referring now to FIG. 6, another embodiment of applicant's invention is disclosed. Specifically, the locking device 20' is fabricated from a material which is particularly characterized by resilient responses to bending at relatively narrow thicknesses. Thus the locking device 20' is generally U-shaped but has been provided with a base portion 26 which interconnects a pair of diverging legs 22' as shown in FIG. 6, portion 26 is relatively narrow as compared to legs 22'. By this relatively simple design the locking device is endowed with the characteristic of spring-like resilience required by applicant's invention. At the same time legs 22' advantageously have been provided with a greater range of flexibility. In all respects the device 20' is utilized the same as the device 20 discussed above and the steps described for assembling and disassembling the locking arrangement remain the same.

Referring next to FIG. 10, yet another embodiment of the locking device is disclosed. The locking device 20" shown, partly in shadow, as part of an assembled locking arrangement, is a one-piece, spring-like, resilient, S-shaped member. FIG. 11 is another view of the same device, as viewed from XI—XI with device 20" in locked position within slot 13. While order of steps followed for assembling and disassembling the arrangement of parts with the locking device in the form remains essentially the same as that for the device in previously discussed forms, some variations in the construction of the locking blades as well as in handling the device are contemplated. FIG. 10 illustrates a modified access slot 19" formed by modified cutaway portions in the locking blades 5a" and 5b". Because, the S-shaped member is not provided with tabs, and is handled somewhat differently than the previously discussed forms, access slot 19" has been modified accordingly. As noted, tabs are not provided for the locking device in this form. The locking device 20" is distorted by squeezing the end portions of the member, as a whole, towards each other, accordion fashion. Thus distorted, the S-shaped member is introduced into loading slot 13. In disassembling the arrangement, since the locking device 20" is not provided with tabs, it is contemplated that with the aid of a tool introduced through modified access slot 19" a slight twisting action applied to the locking device is all that is needed to free it and the bladed members for removal.

It is obvious that many modifications and changes may be made to the illustrated embodiment without departing from the true scope and spirit of the invention as covered in the appended claims. It is therefore understood that the invention may be practiced other than as specifically described.

What is claimed as new and is desired to secure by Letters Patent of the United States is:

1. For use in an axial flow turbomachine, a high speed rotor assembly comprising:
  a rotor spool having a flow path surface including a retaining groove, said groove extending the full circumferential distance around said spool and;
  a plurality of bladed members each of which includes a root portion for mounting said members in mating arrangement with said retaining groove, so as to form a circumferentially extending row of said members each of which is restrained from radial movement by said retaining groove;
  said retaining groove further characterized by a loading slot defined by a widened portion in said groove for receiving said root portions, thereby facilitating the mounting of said bladed members in the retaining groove and;
  a platform seat groove, provided in said spool, portions of which are adjacent each side of said retaining groove and coextensive, therewith and;
  each of said bladed members further characterized by a platform section which section is seated in said platform seat groove in abutting relationship to adjacent platform sections when said bladed members are mounted in the retaining groove and coplanar with the surface of said spool forming, thereby, a composite, continuous flow path surface with said spool and;
  a one-piece springlike, resilient locking device formed to fit within said loading slot and load the radially extending side walls thereof after all the bladed members have been mounted in said retaining groove, thereby locking said bladed members and the locking device in position, and restraining them from circumferential and radial movements with respect to said spool.

2. A high speed rotor assembly as in claim 1 wherein;
  said plurality of bladed members includes a pair of locking blades,
  each of said blades having a cutaway portion provided in said platform section, so that when said blades are adjacently mounted the side of the platform section of each, which is provided with said cutaway, abuts the other, thereby, cooperatively forming an access slot.

3. A high speed rotor assembly as in claim 2 wherein said locking device is generally a U-shaped member.

4. A high speed rotor assembly as in claim 3, said U-shaped locking device further characterized by a tab portion which extends from the end of each leg of said device, and
  a land portion provided on each side of said tab portion extending from each leg,
  whereby each of said tab portions extend beyond said retaining groove into said access slot and said lands abut the underside of each of said platform sections of said locking blades, when said locking device is lockingly positioned in said loading slot of said rotor assembly.

5. A high speed rotor assembly as in claim 2 wherein said locking device is generally an S-shaped member.

6. A rotor member comprising;
  a support member,
  said support member having a circumferentially extending groove for retaining bladed members positioned therein from radial and axial movement with respect to said support member,
  said groove provided with a localized widened portion,
  a row of circumferentially extending bladed members positioned in said groove,
  a one-piece, resilient springlike locking device lockingly engaging the radially extending sidewalls of said localized widened portion and loading said sidewalls thereby preventing said bladed members and the locking device from circumferential and radial movements in said groove.

7. In an axial flow turbomachine rotor assembly including a spool type supporting member having a flow path surface, a circumferentially extending retaining groove in said surface, a row of bladed members mounted in said groove restrained from radial and axial movement, therefrom and means for locking said bladed members from circumferential movement within or separation from said groove comprising;
  a widened portion in said circumferentially extending retaining groove for receiving said bladed members and a locking device,
  said locking device being a one-piece resilient springlike member capable of insertion into said widened portion and movable within said groove,
  said locking shaped to permit said device to spring into locking engagement with that portion of said groove which defines the radially extending sidewalls of said widened portion when said locking device is positioned, therein, thereby locking said row of bladed members in position and restraining said bladed members and the locking device from circumferential movement within or radial separation from said retaining groove.

References Cited

UNITED STATES PATENTS

| | | |
|---|---|---|
| 1,371,327 | 3/1921 | Schneider. |
| 2,199,243 | 4/1940 | Mortimer. |
| 2,393,447 | 1/1946 | Allen. |
| 2,781,962 | 2/1957 | Wilder. |
| 2,994,507 | 8/1961 | Keller. |
| 3,053,504 | 9/1962 | Shelley _____ 253—77 |
| 3,216,700 | 11/1965 | Bostock. |
| 3,252,687 | 5/1966 | Beck et al. _____ 253—77 |

FOREIGN PATENTS 659,592   10/1951   Great Britain.

EVERETTE A. POWELL, Jr., *Primary Examiner.*